United States Patent [19]

Goulooze

[11] Patent Number: 4,672,908

[45] Date of Patent: Jun. 16, 1987

[54] HYDRAULIC TENSIONING DEVICE FOR SAILING VESSEL

[76] Inventor: Marinus Goulooze, Industrie Rd., Mossel Bay, South Africa

[21] Appl. No.: 776,465

[22] Filed: Sep. 16, 1985

[30] Foreign Application Priority Data

Sep. 14, 1984 [ZA] South Africa ............... 84/7280

[51] Int. Cl.⁴ ............................................. B66F 9/22
[52] U.S. Cl. ................................... 114/214; 114/205; 114/213; 92/52
[58] Field of Search ............... 114/109, 102, 34, 111, 114/204, 205, 213–215; 92/52, 65, 51; 60/562; 91/167 R

[56] References Cited

U.S. PATENT DOCUMENTS

| 894,243 | 7/1908 | Thorn | 114/205 |
|---|---|---|---|
| 2,453,357 | 11/1948 | Barkley | 114/111 |
| 2,624,174 | 1/1953 | Loef | 60/52 |
| 3,099,976 | 8/1963 | Schwaneke | 114/91 |
| 3,620,182 | 11/1971 | Russell | 114/109 |
| 3,945,300 | 3/1976 | Bourges | 92/52 |
| 4,002,106 | 1/1977 | Edmo | 92/65 |
| 4,059,063 | 11/1977 | Hood | 114/111 |
| 4,061,099 | 12/1977 | Cook | 114/111 |
| 4,294,572 | 10/1981 | Pattison | 92/52 |

FOREIGN PATENT DOCUMENTS

| 2042237 | 1/1971 | France | 114/214 |
|---|---|---|---|
| 33095 | 5/1928 | Netherlands | 114/214 |
| 900383 | 7/1962 | United Kingdom | 114/214 |
| 988323 | 4/1965 | United Kingdom | 114/214 |

Primary Examiner—Joseph F. Peters, Jr.
Assistant Examiner—C. J. Bartz

[57] ABSTRACT

A hydraulic tensioning device for tensioning the rigging of a sailing vessel comprises first, second and third components which are telescopical with respect to one another. A cylinder of the first component and a piston of the second component form a first chamber, and a cylinder of the second component and a piston of the third component form a second chamber, the two chambers being in fluid flow communication with one another via a passage. The first component is connected to one part of the rigging, and the second component to another part of the rigging. The rigging is tensioned by applying tension to a rope or wire connected to the third component. In another embodiment the first component is mounted for guided displacement along a rail, the second and third components each being connected by a rope or wire to a cam cleat to limit longitudinal displacement.

8 Claims, 5 Drawing Figures

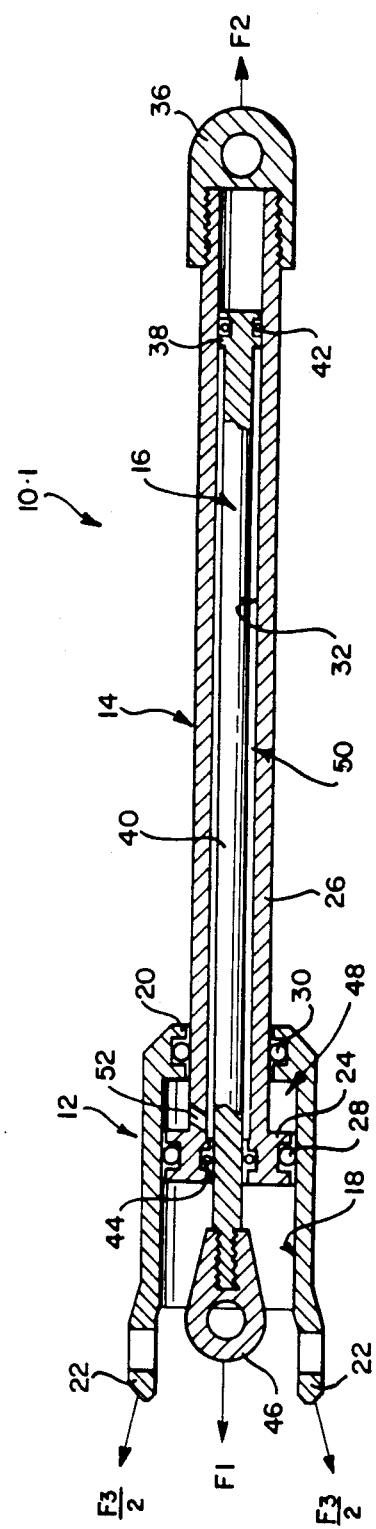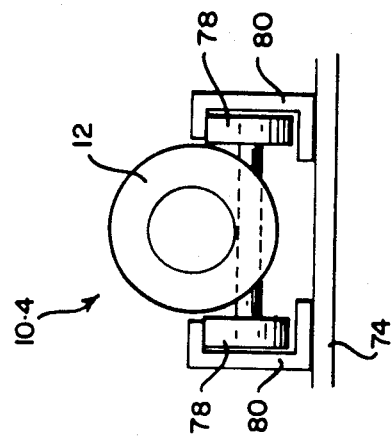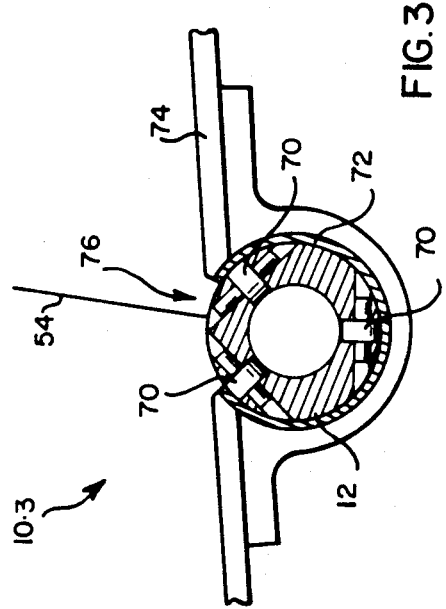

HYDRAULIC TENSIONING DEVICE FOR SAILING VESSEL

FIELD OF THE INVENTION

This invention relates to a tensioning device, and to rigging of a yacht or other sailing vessel including such tensioning device.

SUMMARY OF THE INVENTION

According to the invention there is provided a hydraulic tensioning device which includes:

a first component defining, internally thereof, a first cylinder and having, at one end thereof, a first end wall;

a second component, comprising a first piston co-operating with the first cylinder, and a first piston rod extending axially through the first end wall, there being a fluid-tight seal between the first piston rod and the first end wall, and the second component further defining, internally thereof, a second cylinder coaxial with the first cylinder and having, at one end thereof, a second end wall; and a third component comprising a second piston co-operating with the second cylinder, and a second piston rod extending axially through the second end wall, there being a fluid-tight seal between the second piston rod and the second end wall;

the space defined axially between the first piston and the first end wall and radially between the first piston rod and the first cylinder being in fluid flow communication with the space defined axially between the second piston and the second end wall and radially between the second piston rod and the second cylinder.

The second piston rod may extend from the second piston in a direction opposite that in which the first piston rod extends from the first piston.

Said spaces may be filled with a hydraulic fluid.

Further according to the invention there is provided, in the rigging of a sailing vessel, a hydraulic tensioning device as defined above for tensioning the rigging, said first component being connected to a first part of the rigging and said second component being connected to a second part of the rigging.

The third component may be connected to a flexible, tensionable element (e.g. a rope or wire) leading to a control centre (e.g. the cockpit) of the vessel, whereby the tension in the rigging can be controlled from the control centre by pulling or easing off on said tensionable element.

Said first component may be mounted for guided longitudinal displacement along a rail which is fixed relative to the hull of the vessel, part of the rigging being connected to said first component so as to exert a force on the first component in a direction other than 90° to said longitudinal direction, said second component being provided with first means for adjustably limiting displacement of said second component longitudinally in the direction of the longitudinal component of said force, and said third component being provided with second means for adjustably limiting displacement of said third component longitudinally in a direction opposite to the longitudinal component of said force.

Said first means may comprise a flexible, tensionable element secured to said first piston rod, and a first cam cleat fixed relative to the hull for releasably engaging the tensionable element. Said second means may comprise a flexible, tensionable element secured to said second piston rod, and a second cam cleat fixed relative to the hull of the vessel for releasably engaging the tensionable element.

BRIEF DESCRIPTION OF THE DRAWINGS

The invention will now be described in more detail, by way of example, with reference to the accompanying drawings.

In the drawings:

FIG. 1 is a longitudinal section of a tensioning device in accordance with one embodiment of the invention, for use in the rigging of a yacht;

FIGS. 3 and 4 show, in cross section, two alternative methods of mounting a device such as that illustrated in FIG. 2.

DETAILED DESCRIPTION OF PREFERRED EMBODIMENT

Figure 2:
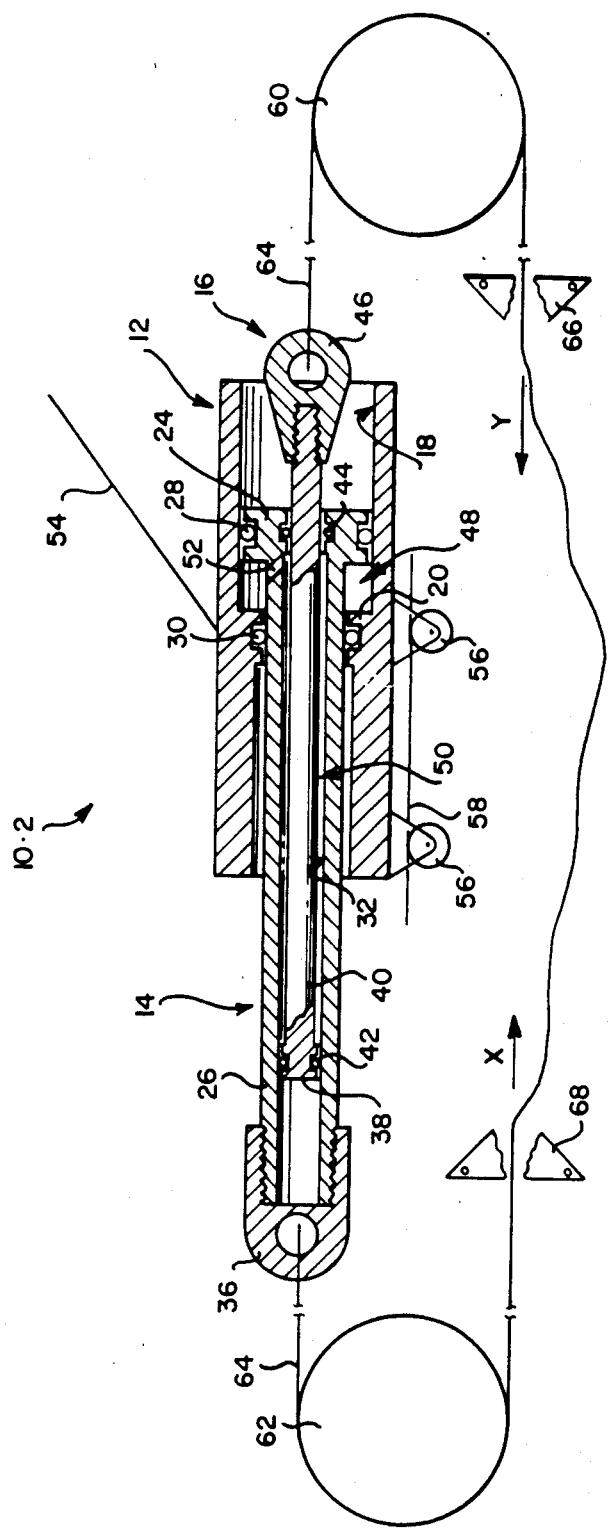
FIG. 2 is a view similar to that shown in FIG. 1, of a tensioning device in accordance with another embodiment of the invention.

Referring first to FIG. 1, reference numeral 10.1 generally indicates a tensioning device comprising a first or outer component 12, a second or intermediate component 14, and a third or inner component 16.

The outer component 12 is hollow and defines, on the inside thereof, a cylinder 18. It has an end wall 20 at one end thereof, and a pair of eyes 22 at the other end thereof.

The intermediate component 14 comprises a piston 24 which co-operates with the cylinder 18, and a hollow piston rod 26 which extends through an opening in the end wall 20. The piston 24 is provided externally with an O-ring 28 to provide a fluid-tight seal between the piston 24 and the cylinder 18, and the end wall 20 is provided with an O-ring 30 which provides a fluid-tight seal between the end wall 20 and the cylindrical outer surface of the piston rod 26.

The piston rod 26 defines, on the inside thereof, a cylinder 32. At the end opposite the piston 24, the cylinder 32 is provided with an eye 36.

The inner component 16 comprises a piston 38 which co-operates with the cyliner 32, and a piston rod 40 which extends through an opening in the piston 24, the piston 24 thus, in effect, forming an end wall for the cylinder 32. The piston 38 is provided with an O-ring 42 which provides a fluid-tight seal between the piston 38 and the cylinder 32. The piston 24 is provided internally with an O-ring 44 which provides a fluid-tight seal between the piston 24 and the piston rod 40. The protruding end of the piston 40 (i.e. the end opposite the piston 38) is provided with an eye 46.

The space defined axially between the piston 24 and the end wall 20, and radially between the piston rod 26 and the cylinder 18 constitutes a first chamber 38, whereas the space defined axially between the piston 38 and the piston 24, and radially between the piston rod 40 and the cylinder 32 constitutes a second chamber 50. The chambers 48 and 50 are in fluid flow communication with one another via a passage 52 in the piston rod 26, close to where it joins the piston 24. The chambers 48 and 50 are filled with a hydraulic fluid.

The device 10.1 is intended for use in tensioning a rope or wire forming part of the rigging of a yacht, in places where high tensile forces are required and where there is little movement, longitudinally, in the rope or wire, as will be described in more detail hereinafter, with reference to FIG. 5.

Referring now to FIG. 2, reference numeral 10.2 generally indicates a tensioning device which is intended for use in tensioning a rope or wire forming part of the rigging of a yacht, in places where high tensile forces are required and where, in addition, substantial movement of the rope or wire should be possible. The device 10.2 is similar in construction to the device 10.1, the same reference numerals being used to indicate the same or similar parts.

The device 10.2 differs from the device 10.1 in that the outer component 12, instead of being provided with eyes 22 at one end, is provided with means (not shown), such as an eye, on one side thereof for enabling a rope or wire 54 to be attached thereto, and, on the opposite side thereof, with runners or wheels 56, the runners or wheels 56 engaging with a track or rail 58. The rail 58 may, for example, be secured to the deck of the yacht and this will enable the device 10.2 to support a transverse force component (i.e. transverse to the direction of the rail) and will further enable the device to be displaced along the rails 58.

At one end of the rail 58 there is mounted a sheave 60, and at the other end a sheave 62. One end of a rope 64 is secured to the eye 46 and extends around the sheave 60 and through a cam cleat 66. The other end of the rope 64 is secured to the eye 36 and extends around the sheave 62 and through a cam cleat 68. The two cam cleats 66 and 68 are opposed to one another, the rope 64 being slack between them.

To adjust the position of the outer component 12 along the rail 58, the rope 64 is pulled in the direction of arrow X, or released from the cam cleat 68 and eased off. To adjust the tension in the rope or wire 54, the rope 64 is pulled in the direction of arrow Y or released from the cam cleat 66 and eased off.

Referring now to FIG. 3, the device 10.3 shown there is similar to the device 10.2 shown in FIG. 2. The device 10.3 differs from the device 10.2 in that, instead of the wheels 56 and the rail 58, the outer component 12 is provided, in the wall thereof, with three circumferentially spaced wheels 70 which protrude only slightly beyond the outer surface of the outer component 12. At least two sets of such wheels are provided at axially spaced positions. The device 10.3 is displaceable longitudinally in a barrel 72, the wheels 70 engaging with the inner surface of the barrel. The barrel 72 is mounted below deck (the deck being indicated by reference numeral 74), there being a longitudinal slot 76 in the deck and the barrel 72, through which the rope 54 (see also FIG. 2) can pass. It will be appreciated that the device 10.3 is also able to rotate about its axis of symmetry with respect to the barrel 72, to a limited extent, depending on the width of the slot 76.

Referring now to FIG. 4, the device 10.4 illustrated there is again similar to the device 10.2 illustrated in FIG. 2. In this embodiment the outer component 12 is provided with at least two axially spaced pairs of external wheels 78 (only one air being shown), the wheels 78 co-operating with a pair of channel-like rails 80 secured to the deck 74 of a yacht.

Figure 5:
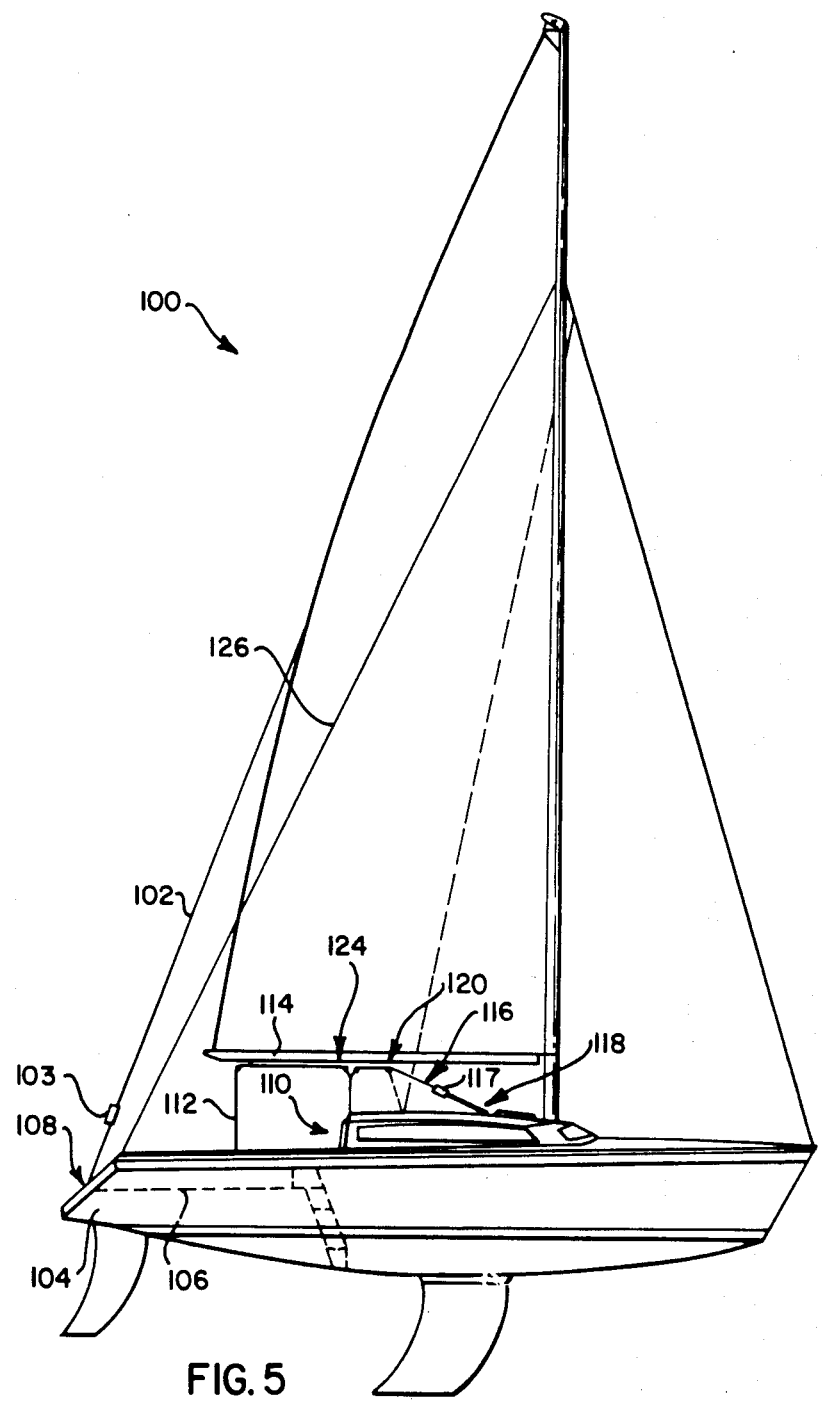
FIG. 5 is a side view of a yacht incorporating the devices illustrated in FIGS. 1 and 2.

Referring now to FIG. 5, reference numeral 100 generally indicates a yacht. The yacht comprises an adjustable backstay 102, adjustability of the stay being provided by a tensioning device 103 of the type illustrated in FIG. 1. The outer member 12 of the device 103 is secured, via the eyes 22, to the hull 104 of the boat, whereas the backstay 102 is secured to the eye 36. To the eye 46, there is attached a rope 106, the rope 106 extending from the eye 46 downwardly, in line with the backstay 102, then around a sheave (not shown) at 108, and then forwards to the cockpit 110 of the yacht.

Thus, it will be seen that the tension in the backstay 102 can be adjusted by pulling or easing off on the rope 106.

The yacht 100 further comprises a kicking strap 116, the kicking strap including a tensioning device 117 of the type illustrated in FIG. 1. The eye 36 of the device 117 is secured to the deck at 118, whereas the eyes 22 are connected to the boom 114 at 120.

There is, furthermore, a main sheet 112 which extends upwardly from the deck to the boom 114, forwardly along the boom to a sheave at 124, downwardly to a sheave (not shown) secured to the deck, upwardy to a further sheave at 124, forwardly along the boom to a sheave at 120, and then towards the device 117 where it is secured to the eye 46.

Referring again to FIG. 1, it will be appreciated by those skilled in the art that, when a force F1 is applied to the eye 46, the force F2 exerted by the intermediate component 14 via the eye 36 is as follows:

$$F2 = F1\left(\frac{D4^2 - D3^2}{D1^2 - D2^2} + 1\right)$$

the force F3 exerted by the outer member 12 via the eyes 22 being:

$$F3 = F2 - F1$$

where
D1 = the outside diameter of the piston rod 40;
D2 = the diameter of the cylinder 32;
D3 = the outside diameter of the piston rod 26; and
D4 = the diameter of the cylinder 18.

The yacht 100 further has a pair of running backstays 126 (only one of which can be seen in the drawing). Each running backstay is secured in the position of the wire 54 to a device such as the one shown at 10.2 in FIG. 2. Upon changing tack, the rope 64 on the one side is uncleated from the cleat 68, thus causing the running backstay 126 on that side to slacken, and the rope 64 on the other side is hauled in and secured in the cleat 68 on that side. The desired tension in the running backstay 126 on the latter side can then be adjusted by pulling or easing off on that end of the rope 64 which is attached to the eye 46.

I claim:
1. A hydraulic tensioning device which includes:
a first component defining, internally thereof, a first cylinder and having, at one end thereof, a first end wall;
a second component displaceable piston-and-cylinder fashion with respect to the first component and comprising a first piston co-operating with the first cylinder, and a first piston rod extending axially through the first end wall, there being a fluid-tight seal between the first piston rod and the first end wall, and the second component further defining, internally thereof, a second cylinder coaxial with the first cylinder and having, at one end thereof, a second end wall; and a third component displaceable piston-and-cylinder fashion with respect to the second component and comprising a second piston co-operating with the second cylinder, and a second piston rod extending axially through the second end wall, there being a fluid-tight seal between the second piston rod and the second end wall;

the space defined axially between the first piston and the first end wall and radially between the first piston rod and the first cylinder being in fluid flow communication with the space defined axially between the second piston and the second end wall and radially between the second piston rod and the second cylinder.

2. A hydraulic tensioning device according to claim 1, wherein the second piston rod extends from the second piston in a direction opposite that in which the first piston rod extends from the first piston.

3. A hydraulic tensioning device as claimed in claim 1 wherein said spaces are filled with a hydraulic fluid.

4. In the rigging of a sailing vessel, a hydraulic tensioning device for tensioning the rigging, the tensioning device including:

- a first component defining, internally thereof, a first cylinder and having, at one end thereof, a first end wall;
- a second component displaceable piston-and-cylinder fashion with respect to the first component and comprising a first piston co-operating with the first cylinder, and a first piston rod extending axially through the first end wall, there being a fluid-tight seal between the first piston rod and the first end wall, and the second component further defining, internally thereof, a second cylinder coaxial with the first cylinder and having, at one end thereof, a second end wall; and
- a third component displaceable piston-and-cylinder fashion with respect to the second component and comprising a second piston co-operating with the second cylinder, and a second piston rod extending axially through the second end wall, there being a fluid-tight seal between the second piston rod and the second end wall;

the space defined axially between the first piston and the first end wall and radially between the first piston rod and the first cylinder being in fluid flow communication with the space defined axially between the second piston and the second end wall and radially between the second piston rod and the second cylinder;

the second piston rod extending from the second piston in a direction opposite that in which the first piston rod extends from the first piston;

said first component being connected to a first part of the rigging; and said second component being connected to a second part of the rigging.

5. Rigging according to claim 4, wherein the third component is connected to a flexible, tensionable element leading to a control centre of the vessel, whereby the tension in the rigging can be controlled from the control centre by pulling or easing off on said tensionable element.

6. Rigging according to claim 4, wherein said first component is mounted for guided displacement in a longitudinal direction along a rail which is fixed relative to the hull of the vessel, wherein part of the rigging is connected to said first component so as to exert a force on the first component in a direction other than 90° to said longitudinal direction, wherein said second component is provided with first means for adjustably limiting displacement of said second component longitudinally in the direction of the longitudinal component of said force, and wherein said third component is provided with second means for adjustably limiting displacement of said third component longitudinally in a direction opposite to the longitudinal component of said force.

7. Rigging according to claim 6, wherein said first means comprises a flexible, tensionable element secured to said first piston rod, and a first cam cleat fixed relative to the hull for releasably engaging the tensionable element.

8. Rigging according to claim 7, wherein said second means comprises a flexible, tensionable element secured to said second piston rod, and a second cam cleat fixed relative to the hull of the vessel for releasably engaging the tensionable element.

* * * * *